June 12, 1934.　　　　C. T. PETKOFF　　　1,962,786
AUTOMOBILE SIGNALING DEVICE
Filed March 23, 1933
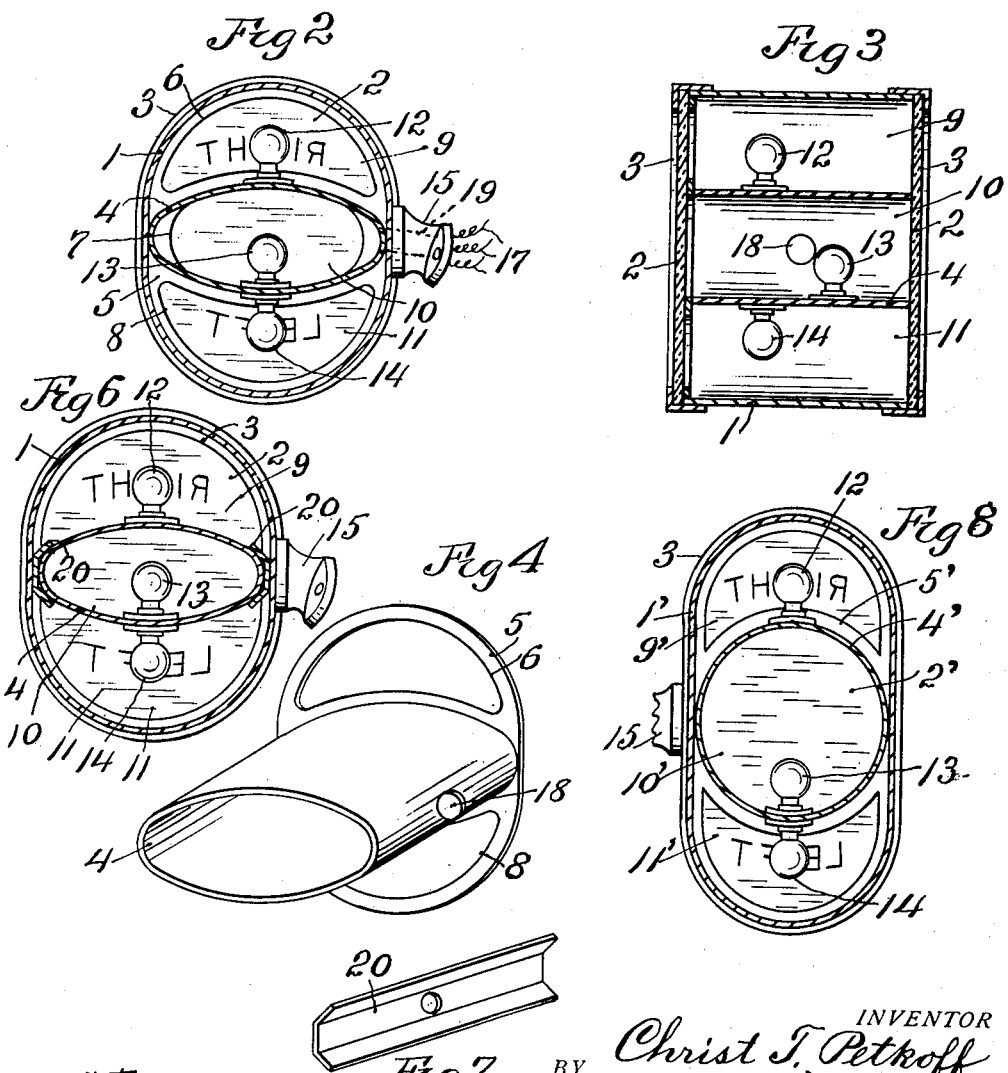

Patented June 12, 1934

1,962,786

UNITED STATES PATENT OFFICE 1,962,786

AUTOMOBILE SIGNALING DEVICE

Christ T. Petkoff, Kansas City, Mo.

Application March 23, 1933, Serial No. 662,263

2 Claims. (Cl. 177—329)

My invention relates to improvements in automobile signaling devices.

The object of my invention is to provide a novel automobile signaling device adapted to display signals which may be seen by day or night from the front or the rear of the car; which provides a minimum of parts; which embodies a tube that alone divides the casing containing it into three compartments in which are respectively located three lamps united with the tube to form an integral structure insertible into and removable from the casing as a unit; and which device is cheap, durable, not likely to get out of order, and is efficient in its operation.

The novel features of my invention are hereinafter fully described and claimed.

In the accompanying drawing, which illustrates my invention,

Fig. 1 is a front elevation of one embodiment of my invention shown mounted on the cowl of a car, a part only of which is shown.

Fig. 2 is a transverse vertical sectional view of the device of Fig. 1.

Fig. 3 is a longitudinal vertical sectional view of the embodiment shown in Fig. 1.

Fig. 4 is a perspective view of the tube and plate shown in Figs. 1, 2 and 3.

Fig. 5 is a front elevation of another embodiment of my invention.

Fig. 6 is a cross section of the device shown in Fig. 5.

Fig. 7 is a perspective view of one of the guide plates shown in Fig. 6.

Fig. 8 is a cross section of still another embodiment of my invention.

Similar characters of reference designate similar parts in the different views.

Referring to Figs. 1 to 4, 1 designates a substantially elliptical casing open at its ends across which respectively extend two lenses 2 respectively held in place by two collars 3 removably mounted on the ends respectively of the casing 1.

A substantially elliptical tube 4 in the casing 1 extends substantially the length of the casing and has two of its sides respectively abutting against opposite walls of the casing 1, its other two sides being spaced from the casing, said tube 4 alone dividing the casing into three compartments.

To one end of said tube 4 is attached a plate 5 which is fitted in and transversely across the casing 1 and which is provided with three openings 6, 7 and 8 which respectively register with the upper compartment 9, middle compartment 10 and lower compartment 11. In addition to supporting the tube 4, the elliptical plate 5 holds the tube 4, without other fastening means, from circumferential movement in the elliptical casing 1.

Three lamps 12, 13 and 14 are respectively in the compartments 9, 10 and 11 and are carried by and united with the tube 4 to form therewith and with said plate 5 a unitary structure which is insertible into or removable from the casing 1 through either end thereof as a unit.

Supporting the casing 1 is a bracket 15 attached to one side of the casing and adapted to be fastened to any desired part of a car, as the cowl 16, as shown in Fig. 1.

Wires 17, Fig. 2, respectively connected to the lamps 12, 13 and 14 may be extended therefrom through a side opening 18, Fig. 4, in the tube 4, and through a hole 19 which registers therewith, and which is shown in dotted lines in Fig. 2, said hole extending through the side wall of the casing 1 and through the bracket 15, from which the wires may be carried through the cowl 16 to any desired part of the car.

For distinguishing the signals from each other, the bulbs of the lamps 12, 13 and 14 may be differently colored, as green, blue and red respectively, or in lieu thereof, those portions of the lenses 2 which respectively register with the compartments 9, 10, and 11 may be similarly colored so as to be translucent.

In the embodiment shown in Figs. 5 and 6, the construction corresponds to that of the embodiment just described, excepting that the plate 5 is eliminated, and in lieu thereof, as a support for the tube 4, opposite inner walls of the casing 1 are provided with two longitudinal channel guides 20 respectively, in which guides opposite side walls of the tube 4 are slidingly and removably supported. By removing either lens 2, the tube 4, together with the lamps 12, 13, and 14 carried thereby, may be inserted into or removed from the casing 1 as a unit. The collars 3 may be removably fastened in place by any usual means adapted for the purpose and not shown.

The embodiment shown in Fig. 8 corresponds to that shown in Figs. 1 to 4, excepting that the tube 4', corresponding in function to the tube 4, is circular in cross section, and the casing 1', plate 5' and lenses 2', corresponding in function to the casing 1, plate 5 and lenses 2 respectively, are of greater vertical height, relatively, to provide sufficient area in the upper and lower compartments 9' and 11', necessitated by the enlarged middle compartment 10′ resulting from the circular form of the tube 4′.

Those portions of the lenses which register with the upper and lower compartments of the different forms may be respectively inscribed "Right" and "Left", as shown, for signaling additional to the colors displayed through the intermediacy of the lamps.

I do not limit my invention to the structures shown and described, as many modifications, within the scope of the appended claims, may be made without departing from the scope of my invention.

What I claim is:—

1. In an automobile signaling device, a casing having an open end, a removable lens across said end, a tube having opposite sides respectively abutting against opposite walls of said casing and extending substantially from one end to the other end of said casing and dividing the latter into three compartments, a plate removably fitted in said casing against said lens and apertured in register with said compartments and attached to the adjacent end of and supporting said tube and holding the latter from circumferential movement in said casing, and three lamps carried by said tube in said compartments respectively and forming with said tube and plate an integral structure insertible into or removable from said casing as a unit upon the removal of said lens.

2. In an automobile signaling device, a casing having an open end, a removable lens across said end, a tube having opposite sides respectively abutting against opposite walls of said casing and extending substantially from one end to the other end of said casing and dividing the latter into three compartments, a plate removably fitted in the other end of said casing and attached to the adjacent end of and supporting said tube and holding the latter from circumferential movement in said casing, and three lamps carried by said tube in said compartments respectively and forming with said tube and plate an integral structure insertible into or removable from said casing as a unit upon the removal of said lens.

CHRIST T. PETKOFF.